United States Patent

Weightman

[15] 3,638,839
[45] Feb. 1, 1972

[54] APPARATUS FOR DISPENSING POWDER SUCH AS ABRASIVE POWDER

[72] Inventor: Herbert G. Weightman, Los Angeles, Calif.

[73] Assignee: Comco Supply, Inc., Burbank, Calif.

[22] Filed: July 18, 1969

[21] Appl. No.: 842,881

[52] U.S. Cl. .................................................. 222/193
[51] Int. Cl. ........................................... B65g 53/16
[58] Field of Search ................ 222/193, 195, 70, 76, 335

[56] References Cited

UNITED STATES PATENTS 2,908,422  10/1959  Braun ............................... 222/193 X Primary Examiner—Stanley H. Tollberg
Attorney—Robert E. Geauque

[57] ABSTRACT

Apparatus for dispensing powder, such as abrasive powder, at a controlled rate from a supply tank to a mixing chamber within a conduit through which flows a gas for conveying the powder to a point of use. A gas pressure modulating valve is installed within the conduit upstream of the mixing chamber for alternately opening and closing the conduit passage at a selected cyclic frequency to modulate the pressure within the mixing chamber between selected high- and low-pressure levels. The powder tank is continuously pressurized to a pressure level greater than the lower pressure level within the mixing chamber, whereby the pulsating pressure within the mixing chamber effects intermittent dispensing of powder at a controlled rate from the tank to the mixing chamber. Valves of unique design and arrangement are provided for controlling gas flow through the apparatus. The principal application of the apparatus involves controlled dispensing of abrasive powder in a high-precision abrasive cutting tool.

12 Claims, 7 Drawing Figures

HERBERT G. WEIGHTMAN
INVENTOR.

BY R. E. Geangue
ATTORNEY

HERBERT G. WEIGHTMAN
INVENTOR.

BY R. E. Geauque
ATTORNEY

APPARATUS FOR DISPENSING POWDER SUCH AS ABRASIVE POWDER

BACKGROUND OF THE INVENTION

1. Field of the Invention

This invention relates generally to the bulk material handling field and more particularly to a powder-dispensing apparatus. The invention relates also to an abrasive cutting tool embodying the apparatus.

2. Prior Art

As will appear from the ensuing description, the present powder-dispensing apparatus may be utilized for various powder-dispensing applications. The invention will be disclosed in connection with one of these applications which involves dispensing abrasive powder to the airstream of an abrasive cutting tool of the general type illustrated in prior U.S. Pat. Nos. 3,053,016 and 3,084,484.

The abrasive cutting tools disclosed in these patents are characterized by an air line having an inlet for connection to a source of high-pressure air or other gas, a discharge nozzle, and an intervening mixing chamber connected to a tank for containing a fine abrasive powder. An air modulator is provided for modulating the pressure within the mixing chamber between high- and low-pressure levels at the selected cyclic frequency. The powder tank is pressurized to a relatively constant pressure level approximating the higher mixing chamber pressure. During operation of the cutting tool, the air pressure within the mixing chamber fluctuates between its high- and low-pressure levels in rapid sequence. This produces a periodic pressure differential between the mixing chamber and abrasive powder tank which blows abrasive powder from the tank into the chamber. The powder enters the airstream flowing through the mixing chamber and is carried by the airstream to the tool nozzle from which the abrasive-laden air is discharged in the form of a high-velocity abrasive cutting jet. Abrasive cutting tools of this type are employed for a variety of precision operations, such as finishing surfaces, removing burrs, removing surface coatings, trimming electrical resistors, and others.

The existing abrasive cutting tools possess certain inherent deficiencies which the present invention overcomes. One of these deficiencies resides in the fact that air pressure within the mixing chamber is modulated by periodically venting to atmosphere the high-pressure air line leading from the air supply to the mixing chamber. This method of modulating mixing-chamber pressure results in flow to the tool discharge nozzle of only a fraction of the high-pressure air supply to the tool. Only this fraction of the incoming air is available for abrasive cutting purposes. The remainder of the air, which is vented to atmosphere, is wasted insofar as abrasive cutting is concerned.

Another deficiency of the existing abrasive cutting tools involves the type of air modulator they employ. This air modulator is a vent valve operated by a reciprocating pneumatic piston. The piston is driven in one direction by the vent air from the high-pressure air line and in the opposite direction by gravity. Proper operation of the air modulator requires relatively long stroke length and vertical orientation of the reciprocating valve piston. As a consequence, the air modulator is quite large and results in a correspondingly large and bulky abrasive cutting tool. Moreover, the modulator embodies a number of parts which must be made with a fairly high degree of precision and is thus relatively complex and costly. In addition, starting and stopping the valve piston during intermittent operation of the abrasive cutting tool, and regulating the reciprocating speed of the piston to regulate abrasive powder flow, are difficult to accomplish. As a consequence, the mechanisms for performing these regulating functions are quite complex and costly.

A further deficiency of the existing abrasive cutting tools resides in the manner in which they cut off airflow to the tool nozzle so as to permit intermittent tool operation. Thus, airflow is cut off by constricting the flexible air line or hose which extends from the mixing chamber to the tool nozzle. This is accomplished by clamping the hose between a pair of clamping elements, such as a piston and an anvil. These clamping elements always engage the same portion of the hose, with the result that the hose is subject to rapid wear and requires frequent replacement. Such replacement is not only costly because of the capital cost of the hose itself, but also because of the substantial time required to accomplish the replacement task.

SUMMARY OF THE INVENTION

According to one of its more limited aspects, the present invention provides an abrasive cutting tool of the character described which avoids the above-noted and other deficiencies of the existing tools. The major improvement in the present abrasive cutting tool resides in its improved abrasive powder-dispensing apparatus. As noted earlier, this powder-dispensing apparatus, per se, may be utilized for other purposes and constitutes a broader aspect of the invention.

The improved powder-dispensing apparatus of the invention is generally similar to the existing abrasive powder dispensers discussed above. Thus, the present powder-dispensing apparatus has a main inlet conduit for connection to a source of gaseous working fluid under pressure, a powder tank communicating with a mixing chamber in the conduit, a modulator for modulating the fluid pressure in the mixing chamber between high- and low-pressure levels, and means for pressurizing the powder tank to a relatively constant pressure level approximating the average of the high and low mixing chamber pressures. It should be noted here that various gaseous working fluids may be employed in the present invention. However, for ease of description, it will be assumed that the working fluid is air. The present powder-dispensing apparatus also operates in generally the same manner as the existing abrasive powder dispensers, in that powder is periodically blown from the powder tank into the mixing chamber each time the fluctuating chamber pressure drops to its lower pressure level. This powder enters the main airstream flowing through the mixing chamber and is transported by the stream to the point of utilization of the powder. In the present abrasive cutting tool, the powder is transported by the airstream to the tool nozzle, from which the abrasive-laden air is expelled as a high-velocity abrasive cutting jet.

One important feature of the present powder-dispensing apparatus resides in the fact that the modulator for modulating the air pressure within the mixing chamber is a valve located within the main air conduit or passage between the air inlet and the mixing chamber. This valve is alternately opened and closed at a selected cyclic frequency to periodically restrict airflow through the passage to the mixing chamber and thereby cause the chamber pressure to fluctuate, as described. An important advantage of this method of modulating the mixing chamber pressure is that the entire volume of incoming air supplied to the dispensing apparatus flows through the mixing chamber and is available for transporting powder from the chamber to its point of utilization. Obviously, this constitutes a distinct benefit in abrasive cutting tools, since all of the air supplied to the tools is available for abrasive cutting purposes.

Another important feature of the invention involves the air modulator itself which is a solenoid valve of unique construction. A fluctuating electrical signal is impressed on the valve coil to effect alternate opening and closing of the valve at the desired frequency.

The powder-dispensing apparatus and abrasive cutting tool of the invention possess other beneficial features. Foremost among these other features is a unique shutoff valve which constricts or squeezes the discharge hose leading from the mixing chamber to block flow of powder-laden air through the hose. The valve is uniquely arranged to permit exposure of different portions of the hose to the squeezing action of the valve, thus to prolong hose life. Another feature is a unique control system for the air modulator and the shutoff valve, whereby the modulator and shutoff valve normally assume their closed positions to cut off both powder and airflow except when the system is deliberately actuated. Also embodied in the powder-dispensing apparatus are a unique filter arrangement to prevent backflow of powder through the air system and a unique replaceable orifice and tank vent arrangement for regulating powder flow from the powder tank into the mixing chamber.

DESCRIPTION OF THE PREFERRED EMBODIMENT

Figure 1:
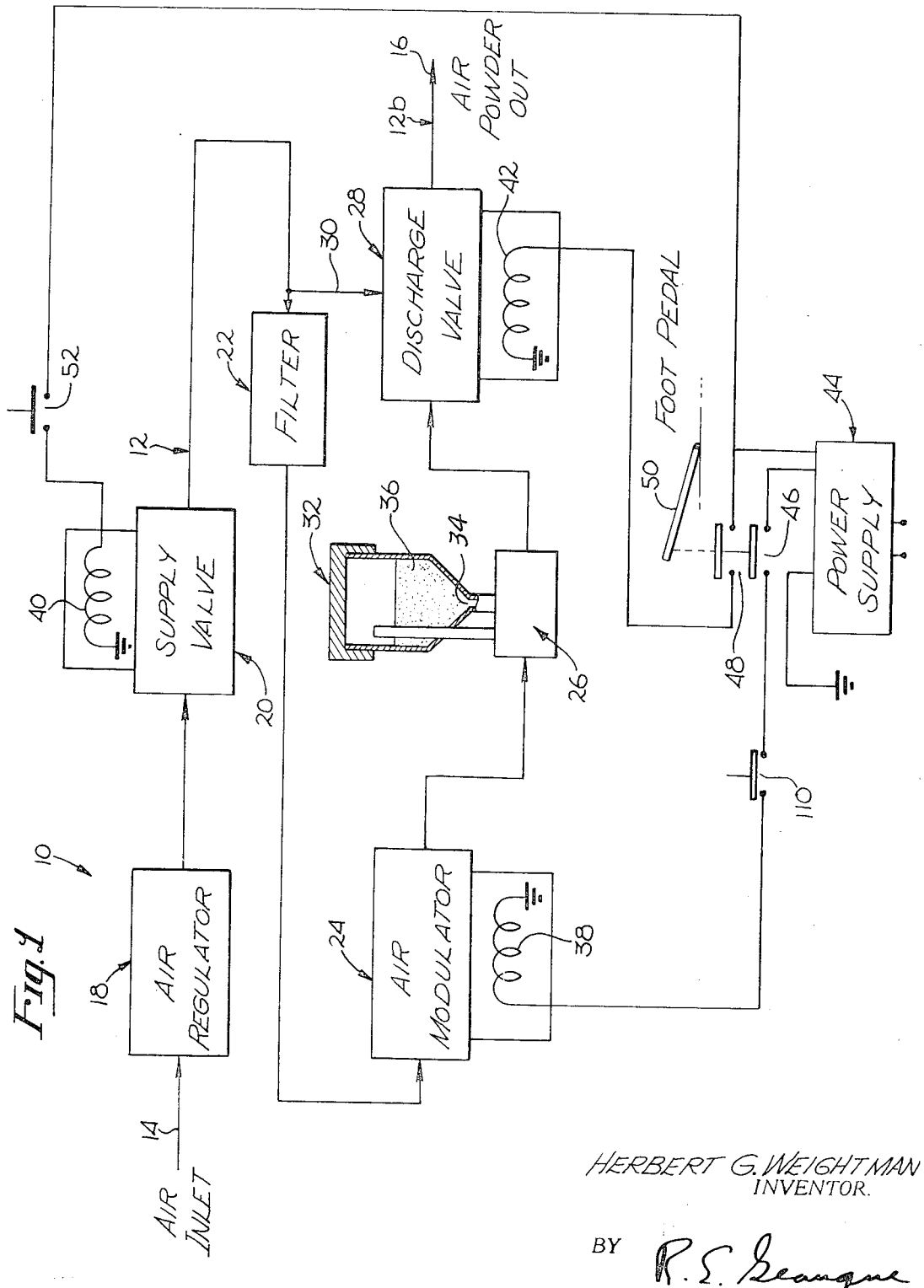
FIG. 1 diagrammatically illustrates a powder-dispensing apparatus and abrasive cutting tool according to the invention.
Figure 2:
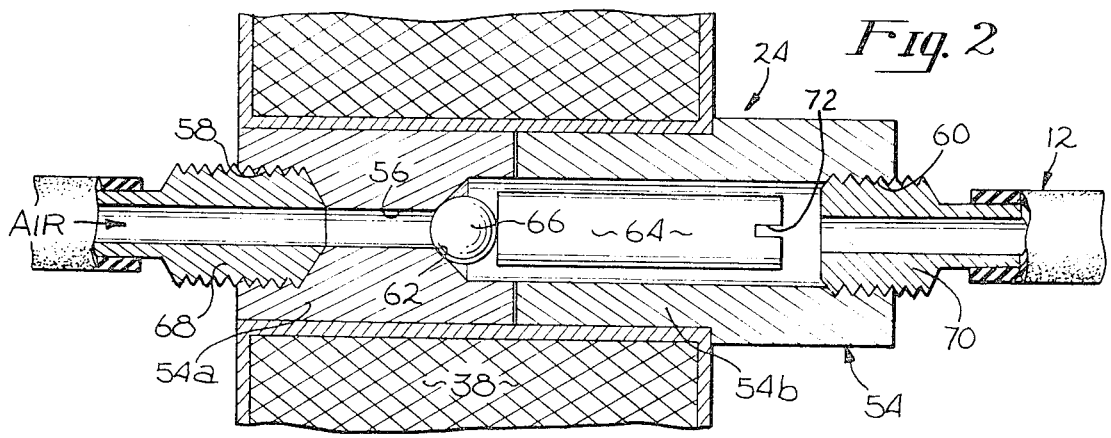
FIG. 2 is an enlarged section through an air modulator of the tool.
Figure 3:
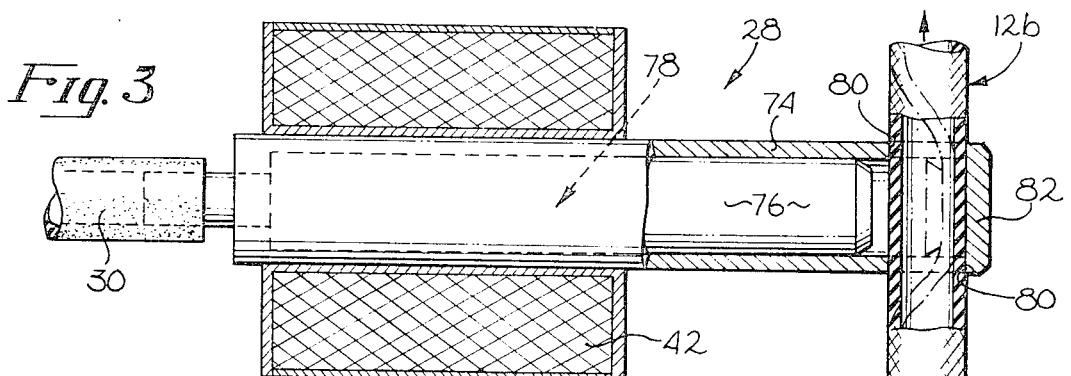
FIG. 3 is an enlarged section through a discharge valve of the tool.
Figure 4:
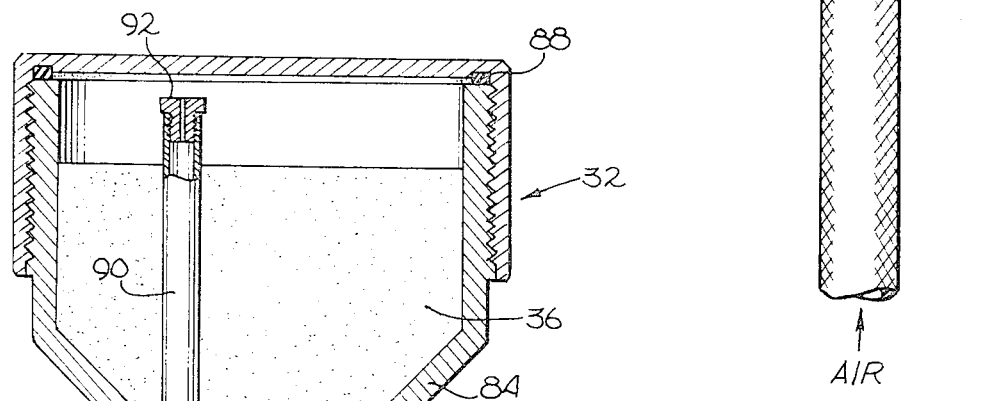
FIG. 4 is an enlarged section through an abrasive powder tank of the tool.

Turning now to these drawings, there is diagrammatically illustrated a powder-dispensing apparatus 10 according to the invention. This powder-dispensing apparatus has a main flow conduit or inlet line 12 terminating at one end in an inlet 14 for connection to a source of working fluid under pressure. As noted earlier, this working fluid is assumed to be air. The opposite end of the air line terminates in an outlet 16. Arranged in series within the air line 12 are an adjustable air regulator 18, a main shutoff or supply valve 20 which, in this instance, is a solenoid valve, a filter 22, an air modulator 24, a mixing chamber 26, and a secondary shutoff or discharge valve 28. Discharge valve 28 is a solenoid-controlled pneumatic valve which receives operating air from the main air line 12 through a branch conduit or air line 30. Also included in the powder-dispensing apparatus is a powder tank 32 which communicates with the mixing chamber 26 through a powder-metering exit orifice 34 in the lower end of the tank. This tank contains a quantity of fine powder or powderlike material 36 to be dispensed.

As will appear presently, the air modulator 24 is effectively a solenoid valve. This modulator valve, the supply valve 20, and the discharge valve 28 have coils 38, 40, and 42, respectively. Coils 38, 40, and 42 are energized from an electrical powder supply 44 which furnishes AC or intermittent current pulses of fixed selectively variable frequency to the modulator coil 38 and continuous energizing current to the supply and discharge valve coils 40, 42. In this case, the electrical powder supply 44 is a halfway rectifier, the output of which provides the energizing current for the air modulator valve coil and the input of which provides the energizing current for the supply and discharge valve coils. Modulator and discharge valve coils are connected to the power supply 44 through normally open switches 46 and 48 controlled by a common switch actuator 50, such as a foot pedal. The supply valve coil is connected to the power supply through an on-off switch 52, such as a toggle switch.

Briefly, in operation of the powder-dispensing apparatus 10, assuming the supply valve 20 to be energized and open, the discharge valve 28 to be deenergized and closed, and the air modulator 24 to be deenergized and inoperative, the incoming air passes through the modulator to the mixing chamber 26 and from this chamber to the interior of the powder tank 32 through its exit orifice 34. The air pressure in the mixing chamber and powder tank immediately equalize, and the system assumes a pressurized inactive condition. Closing of the modulator and discharge valve switches 46, 48 activates the air modulator 24 and opens the discharge valve 28. The modulator then alternately opens and closes the air passage through the air line 12 at the frequency of the electrical signal applied to the modulator. This action modulates the air pressure within the mixing chamber 26 between high- and low-pressure levels. Because of the large volume of the powder tank compared to that of the mixing chamber and the resistance to airflow between the mixing chamber and powder tank, the interior tank pressure tends to remain relatively constant at a pressure level approximating the average of the high and low mixing chamber pressures. It will be recognized, of course, that with the modulator operating at fixed frequency, the system tends to assume a stable operating condition at which the higher mixing chamber pressure and tank pressure are slightly less than the supply pressure.

Each time the fluctuating mixing chamber pressure rises to its higher pressure level, the chamber pressure exceeds the tank pressure. Under these conditions, no powder flow occurs from the powder tank 32 to the mixing chamber 26. Each time the fluctuating chamber pressure drops to its lower level, on the other hand, the tank pressure exceeds the chamber pressure. The resulting pressure differential blows or discharges a small amount of the powder 36 from the tank into the chamber. This powder enters the main airstream flowing through the chamber and is transported by the airstream to the outlet 16. The particular inventive embodiment illustrated is an abrasive cutting tool in which the powder 36 is a fine abrasive powder, and the outlet 16 is a nozzle from which the abrasive-laden air arriving at the outlet issues in the form of a high-velocity abrasive cutting jet.

One important feature of the invention resides in the manner in which the air modulator 24 modulates the air pressure within the mixing chamber 26. According to the present invention the air modulator 24 is arranged in series within the air line 12 and is operative to modulate the air pressure within the mixing chamber 26 by opening and closing the air passage, rather than by venting air from the passage as in the prior art abrasive cutting tools. This results in the delivery to the discharge nozzle of the entire volume of incoming air and renders this entire volume of air available for abrasive cutting purposes.

Another important feature of the invention concerns the construction of the air modulator 24. This air modulator has a tubular barrel 54 with a central air passage 56. Air passage 56 has an inlet 58 at one end and an outlet 60 at the opposite end. Surrounding the air passage 56 adjacent the inlet 58 and facing downstream of the passage is an annular valve seat 62. A magnetically permeable plunger 64 is movable lengthwise within the air passage 56 and is smaller in cross section than the passage to permit airflow about the plunger. Between the plunger 64 and the valve seat 62 is a valve ball 66. Inlet 58 and outlet 60 are threaded for receiving nipples 68, 70 on the air line 12. The outlet nipple 70 forms a stop shoulder for the plunger 64. The adjacent end of the plunger is grooved at 72 to permit airflow to the outlet 60 when the plunger seats against the nipple 70. Surrounding the barrel 54 is the modulator coil 38.

Air entering the modulator 24 moves the modulator plunger 64 and ball 66 away from the valve seat 62 to permit airflow through the modulator. The modulator is then opened. The coil 38 is situated along the modulator barrel in such a way that when the coil is energized, the plunger 64 is magnetically driven toward the valve seat 62 to engage the valve ball 66 with the seat and thereby close the modulator against airflow. It will now be understood that periodic energizing of the modulator valve coil 38 by the output of the power supply 44 causes rapid opening and closing of the modulator to modulate or pulse the air pressure in the mixing chamber 26 in the manner described earlier. In order to improve or optimize the magnetic flux path of the modulator, and thereby aid or enhance its pressure-modulating action, the modulator barrel 54 is made in two sections. One of these sections is a magnetically permeable head section 54a which carries the valve seat 66. The other barrel section 54b is constructed of a nonmagnetically permeable material. The valve ball 66 is also constructed of a nonmagnetically permeable material. Thus, when the modulator coil 38 is energized, the modulator plunger 64 reciprocates at the frequency of the applied voltage to pulse the air pressure within the mixing chamber 26.

Another feature of the invention resides in the construction and arrangement of the discharge valve 28. This valve has an outer barrel 74 containing a pneumatic plunger 76. The valve receives operating air through the branch air line 30, referred to earlier. This branch air line connects to one end of the valve barrel 74. Flow of air from the air line into the barrel is controlled by a normally open solenoid pilot valve 78. When the coil 42 of this pilot valve is energized, the pilot valve closes the air inlet to the valve barrel 74 and vents the latter to atmosphere so as to remove air pressure from the valve plunger 76. This closing of the air inlet and venting the valve barrel 74 is to be accomplished by means of conventional valve assemblies (not shown). These valve assemblies may or may not be controlled directly by the coil 42. When the coil is deenergized, the pilot valve opens the inlet and closes the vent to admit air under pressure to the valve barrel. The valve plunger 76 is then driven toward the opposite end of the barrel.

Extending transversely through the latter barrel end are a pair of aligned holes 80 through which slidably passes the outlet section 12b of the air conduit or air line 12 leading from the mixing chamber 26. This section of the air line is a flexible hose which, in the illustrated abrasive cutting tool, connects to the nozzle 16. When the discharge valve 28 is deenergized to admit air under pressure to the valve barrel 74, the valve plunger 76 is driven against the hose 12b and compresses or squeezes the latter between the plunger and the end wall 82 of the valve barrel. This action closes the air passage within the hose to block flow of air to the nozzle 16. When the discharge valve 28 is energized to vent the valve barrel 74, the hose 12b is released to expand to its normal configuration under the action of the internal air pressure within the hose. This action forces the valve plunger 76 back and opens the hose passage to airflow to the outlet nozzle 16.

A feature of the invention resides in the fact that when the actuator 50 for the air modulator and discharge valve switches 46, 48 is released, the discharge valve 28 is conditioned to close immediately upon opening of the supply valve 20 to admit pressure air to the system. This prevents any powder within the hose 12b from being expelled through the nozzle when the supply valve is first opened. The air modulator 24, of course, remains inoperative, and no powder is dispensed from the powder tank 32 until the switch actuator 50 is depressed.

Another feature of the invention resides in the fact that the hose 12b may be moved back and forth through and rotated within the discharge valve barrel 74. This action exposes different portions of the hose to the squeezing action of the valve plunger 76 so as to prolong hose life.

The illustrated mixing chamber 26 and powder tank 32 comprise a unitary casting 84 which defines the mixing chamber and the cylindrical tank wall. This wall is externally threaded at its upper end to receive a threaded cap 86. A seal ring 88 on the cap seats against the upper end face of the tank wall to seal the tank when the cap is in place. Cap 86 is removable to fill the tank with the powder 36 to be dispensed and to clean or replace the powder-metering orifice 34.

A feature of the invention concerned with the orifice 34 resides in the fact that the latter is replaceable to vary its size and thereby the amount of powder dispensed during each cycle of the air modulator 24. The orifice is accessible for replacement by removing the cap 86 of the powder tank 32 and any powder contained in the tank. Regulation of the powder-dispensing rate may also be accomplished by regulating the frequency of the current which operates the air modulator valve to regulate the open time of this valve.

If desired, additional adjustment of the powder flow rate from the powder tank 32 to the mixing chamber 26, and hence from the mixing chamber to the nozzle 16, may be accomplished by providing an air bypass or bleed passage between the mixing chamber and the upper end of the powder tank. The illustrated embodiment of the invention, for example, has an air bleed or bypass tube 90 for this purpose. The upper end of the tube is threaded to receive an insert 92. This insert may be a plug which seals and thereby inactivates the tube or an orifice which permits controlled air leakage between the mixing chamber and the upper end of the tank. When the plug is in place, the operation of the apparatus occurs as already described. When the plug is replaced by an air orifice, air leakage through the bleed tube 90 will tend to reduce the maximum pressure differential between the tank and the mixing chamber and hence the amount of powder dispensed during each cycle of the air modulator 24. The greater the orifice size, the greater the air leakage and hence the smaller the maximum pressure differential between the mixing chamber and tank and the smaller the powder flow rate.

The illustrated abrasive cutting tool of the invention has a further unique feature residing in the exit tip 94 of the discharge nozzle 16. This tip is threaded within the nozzle body so that it may be removed for replacement by an orifice tip of different orifice size and/or shape. Different nozzle tips may be color coded to indicate their orifice size.

Figure 6:
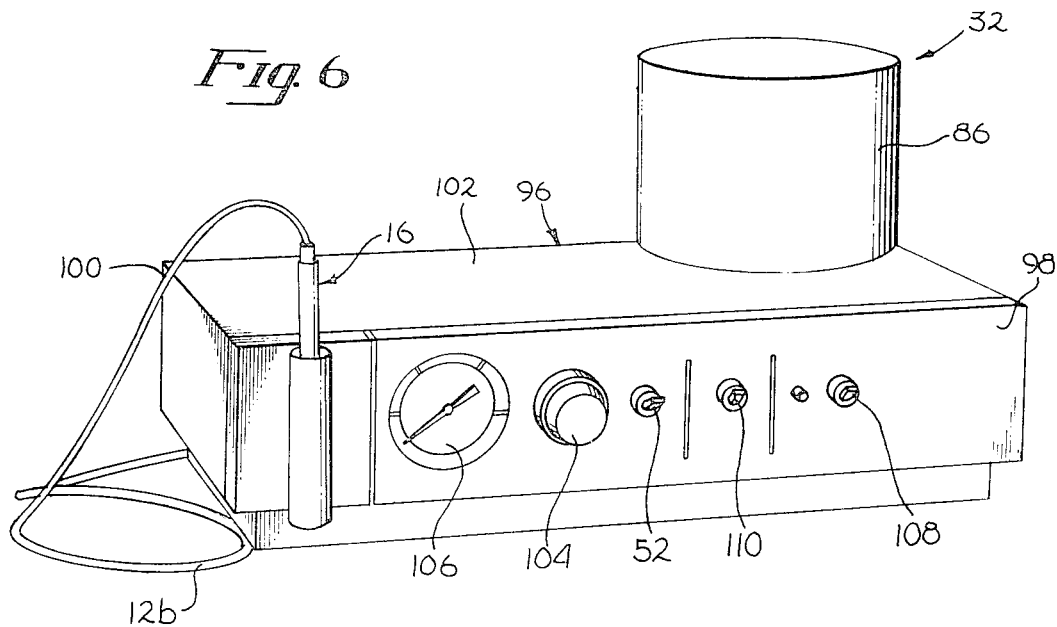
FIG. 6 is a perspective view of the tool cabinet.
Figure 5:
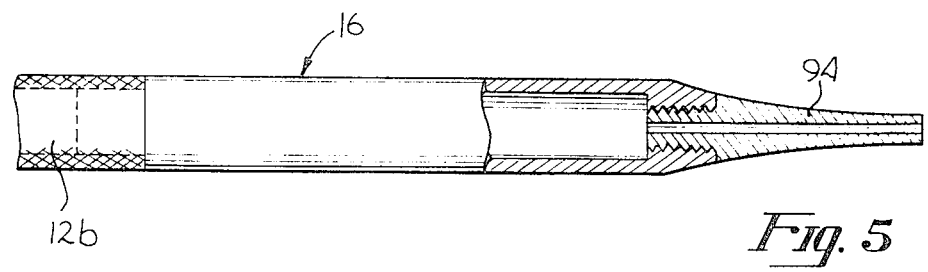
FIG. 5 is an enlargement, partially in section, of the tool nozzle.

The several components of the present powder-dispensing apparatus and abrasive cutting tool may be packaged in any desired way. The components of the illustrated abrasive cutting tool, for example, are mounted within a cabinet 96 having a front control panel 98, a rear control panel 100, and a top panel 102. Mounted on the front control panel are a knob 104 for adjusting the pressure regulator 18, a gage 106 for indicating the regulator outlet pressure, the switch 52 for the supply valve 20, and two additional switches 108 and 110. Switch 108 is a main power switch which turns the power supply 44 on and off. Switch 110 is a mode selector switch having an "abrasive" position and an "air only" position. This switch is connected between the air modulator 24 and its power supply switch 46. Accordingly, if the switch 110 is placed in its open position, depression of the power supply switch actuator 50 opens the shutoff valve 28 without energizing the air modulator 24. Under these conditions, airflow occurs through the system without resulting in any powder flow from the powder tank 32 into the mixing chamber 26. When the switch 110 is closed, on the other hand, depression of the switch actuator 50 energizes both the air modulator 24 and the shutoff valve 28. Under these conditions, the system operates in its powder-dispensing mode, described earlier. The abrasive powder tank 32 projects through an opening in the top panel 102 of the cabinet 96, as shown in FIG. 6, to expose the tank cap 86 for ease of removal from and replacement on the tank. The discharge valve 28, not visible in FIG. 6, is mounted within the cabinet 96 adjacent the rear panel 100 of the cabinet, in such a way that the airhose 12b extends from the valve through the rear panel. This permits the hose to be adjusted back and forth through the valve in the manner explained earlier.

Figure 7:
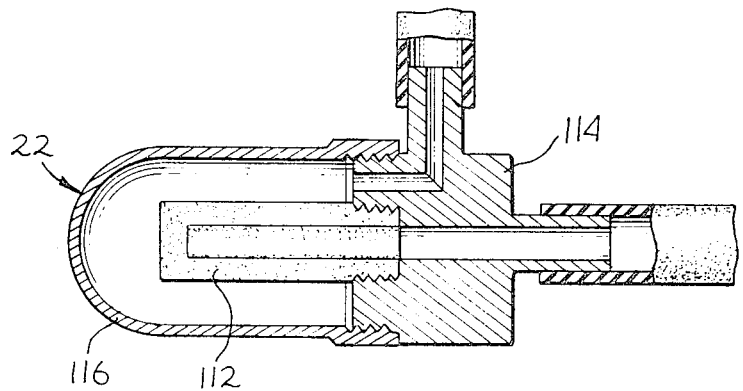
FIG. 7 is an enlargement through a filter embodied in the tool.

As noted earlier, a filter 22 is positioned in the air line 12 between the air supply valve 20 and the air modulator 24. This filter is designed to block reverse flow of powder through the system into the supply valve, the air regulator 18 and the discharge valve 28. Any suitable filter may be utilized for this purpose. According to a preferred feature of the invention, however, the filter comprises a porous filter element 112 to which is also removably secured a glass envelope 116 enclosing the filter element. As shown in FIG. 7, the filter is connected in the air system in such a way that under normal conditions, air enters the filter through the interior of the porous filter element 112 and then flows outwardly through this element to the filter outlet. In the event of a malfunction which causes reverse airflow through the system, airflow occurs in the opposite direction through the filter. Under these conditions, powder contained in the air will be trapped within and can be observed through the glass envelope 116 which can then be removed to empty the powder.

I claim:

1. A powder-dispensing apparatus comprising:

a tank having an interior chamber for containing a quantity of a powder, a conduit containing a passage having an inlet end for connection to a source of gas under pressure and an opposite outlet end, first means providing a powder injection passage communicating the lower end of said tank interior chamber to said conduit passage, the intersection of said passages constituting a mixing chamber, a gas pressure modulator connected to said conduit upstream of said mixing chamber, said modulator to vary the air pressure within said conduit passage resulting in a modulation of the pressure in said mixing chamber between selected high- and low-pressure levels, said varying of the air pressure by said modulator being accomplished by restricting the flow of gas through said conduit passage, and second means for pressurizing said tank interior chamber above at least a portion of time powder to a pressure level greater than said low-pressure level, whereby powder is dispensed from said tank interior chamber to said mixing chamber at a controlled rate.

2. Powder-dispensing apparatus according to claim 1 wherein:

said modulator comprises a valve in said conduit passage, and third means for opening and closing said valve at a selected frequency which may be varied to regulate powder flow rate.

3. Powder-dispensing apparatus according to claim 1 wherein:

said modulator comprises a solenoid valve in said conduit passage, third means for energizing said valve with a fluctuating electrical signal for opening and closing said valve at a selected frequency.

4. A powder-dispensing apparatus comprising:

a tank having an interior chamber for containing a quantity of a powder;

a conduit containing a passage having an inlet end for connection to a source of gas under pressure and an opposite outlet end;

first means providing a powder injection passage communicating the lower end said tank interior chamber to said conduit passage, the intersection of said passages constituting a mixing chamber;

a gas pressure modulator connected to said conduit upstream of said mixing chamber, said modulator to vary the air pressure within said conduit passage resulting in a modulation of the pressure in said mixing chamber between selected high- and low-pressure levels;

second means for pressurizing said tank interior chamber above at least a portion of the powder to a pressure level greater than said low-pressure level, whereby powder is dispensed from said tank interior chamber to said mixing chamber at a controlled rate;

said modulator comprises a solenoid valve in said conduit passage, third means for energizing said valve with a fluctuating electrical signal for opening and closing said valve at a selected frequency;

said modulator comprises a solenoid valve in said conduit passage, third means for energizing said valve with a fluctuating electrical signal for opening and closing said valve at a selected frequency;

said solenoid valve includes a barrel providing a portion of said conduit, a magnetically permeable plunger movable longitudinally within said barrel, an annular valve seat within said barrel at the upstream end of said plunger and surrounding said conduit passage, whereby gas flow through the latter passage urges said plunger away from said valve seat, a coil surrounding said barrel and adapted to be energized by said fluctuating electrical signal for periodically urging said plunger toward said valve seat, and valve means at the upstream end of said plunger engageable with said valve seat upon movement of said plunger toward said valve seat to close said conduit passage.

5. Powder-dispensing apparatus according to claim 4 wherein:

said valve barrel comprises a nonmagnetically permeable sleeve containing said plunger and a magnetically permeable head joined to the upstream end of said sleeve and providing said valve seat, and said valve means comprises a nonmagnetically permeable valve ball positioned between said valve seat at the upstream end of said plunger.

6. Powder-dispensing apparatus according to claim 1 wherein:

gas under pressure is adapted to flow from said mixing chamber through said powder injection passage into said tank interior chamber when said conduit is initially connected to said pressurized gas source, whereby said injection passage serves the dual function of providing said tank interior chamber pressurizing means and a means for conveying powder from said tank chamber to said mixing chamber.

7. Powder-dispensing apparatus according to claim 1 including:

a replaceable nozzle insert removably fixed within the tank end of said powder injection passage and containing an orifice through which powder passes from said tank chamber to said mixing chamber.

8. A powder-dispensing apparatus comprising:

a tank having an interior chamber for containing a quantity of a powder;

a conduit containing a passage having an inlet end for connection to a source of gas under pressure and an opposite outlet end;

first means providing a powder injection passage communicating the lower end said tank interior chamber to said conduit passage, the intersection of said passages constituting a mixing chamber;

a gas pressure modulator connected to said conduit upstream of said mixing chamber, said modulator to vary the air pressure within said conduit passage resulting in a modulation of the pressure in said mixing chamber between selected high- and low-pressure levels;

second means for pressurizing said tank interior chamber above at least a portion of the powder to a pressure level greater than said low-pressure level, whereby powder is dispensed from said tank interior chamber to said mixing chamber at a controlled rate;

said modulator comprises a solenoid valve in said conduit passage, third means for energizing said valve with a fluctuating electrical signal for opening and closing said valve at a selected frequency; and said third means comprises a pipe communicating said conduit passage to the upper end of said tank interior chamber, and fourth means for selectively regulating the effective flow area of the passage within said pipe.

9. Powder-dispensing apparatus according to claim 8 wherein:

said fourth means comprises a replaceable nozzle within said pipe.

10. A powder-dispensing apparatus comprising:

a tank having an interior chamber for containing a quantity of a powder;

a conduit containing a passage having an inlet end for connection to a source of gas under pressure and an opposite outlet end;

first means providing a powder injection passage communicating the lower end said tank interior chamber to said conduit passage, the intersection of said passages constituting a mixing chamber;

a gas pressure modulator connected to said conduit upstream of said mixing chamber, said modulator to vary the air pressure within said conduit passage resulting in a modulation of the pressure in said mixing chamber between selected high- and low-pressure levels;

second means for pressurizing said tank interior chamber above at least a portion of the powder to a pressure level greater than said low-pressure level, whereby powder is dispensed from said tank interior chamber to said mixing chamber at a controlled rate;

said modulator comprises a solenoid valve in said conduit passage, third means for energizing said valve with a fluctuating electrical signal for opening and closing said valve at a selected frequency; and a normally closed gas pressure operated shutoff valve along said conduit for controlling gas flow through said conduit passage, means communicating the inlet end of said conduit passage to said shutoff valve, whereby connection of said conduit passage to a source of gas under pressure closes said shutoff valve to block gas flow through said conduit passage to said mixing chamber, and fifth means for selectively opening said shutoff valve.

11. Powder-dispensing apparatus according to claim 10 wherein:

said shutoff valve comprises a pneumatic solenoid valve, and said fifth means comprises a coil on said shutoff valve adapted to be energized to open said valve.

12. A powder-dispensing apparatus comprising:

a tank having an interior chamber for containing a quantity of a powder;

a conduit containing a passage having an inlet end for connection to a source of gas under pressure and an opposite outlet end;

first means providing a powder injection passage communicating the lower end said tank interior chamber to said conduit passage, the intersection of said passages constituting a mixing chamber;

a gas pressure modulator connected to said conduit upstream of said mixing chamber, said modulator to vary the air pressure within said conduit passage resulting in a modulation of the pressure in said mixing chamber between selected high- and low-pressure levels;

second means for pressurizing said tank interior chamber above at least a portion of the powder to a pressure level greater than said low-pressure level, whereby powder is dispensed from said tank interior chamber to said mixing chamber at a controlled rate;

said modulator comprises a solenoid valve in said conduit passage, third means for energizing said valve with a fluctuating electrical signal for opening and closing said valve at a selected frequency; and the length of said conduit downstream of said mixing chamber comprises a flexible hose, and valve means for selectively closing the flow passage within said hose including a valve body having a transverse bore slidably receiving said hose, whereby said hose may be moved longitudinally and rotated within said bore, a plunger movable in said body into contact with said hose to compress said hose between said plunger and the wall of said bore, thereby to block gas flow through said hose, and means for moving said plunger in said valve body to compress and release said hose, and said hose being movable longitudinally and rotatably within said body bore for periodically exposing a different portion of the hose wall to said plunger.

* * * * *